(12) United States Patent
Hamagami et al.

(10) Patent No.: US 8,175,982 B2
(45) Date of Patent: May 8, 2012

(54) VALUE FUNCTION REPRESENTATION METHOD OF REINFORCEMENT LEARNING AND APPARATUS USING THIS

(75) Inventors: Tomoki Hamagami, Tokyo (JP); Takesi Shibuya, Chiba (JP)

(73) Assignee: Nat'l University Corp. Yokohama Nat'l University, Yokohama (JP)

( * ) Notice: Subject to any disclaimer, the term of this patent is extended or adjusted under 35 U.S.C. 154(b) by 736 days.

(21) Appl. No.: 12/065,558

(22) PCT Filed: Aug. 18, 2006

(86) PCT No.: PCT/JP2006/316659
§ 371 (c)(1),
(2), (4) Date: Oct. 28, 2008

(87) PCT Pub. No.: WO2007/029516
PCT Pub. Date: Mar. 15, 2007

(65) Prior Publication Data
US 2009/0234783 A1 Sep. 17, 2009

(30) Foreign Application Priority Data
Sep. 2, 2005 (JP) .................................. 2005-254763

(51) Int. Cl.
*G06F 15/18* (2006.01)
*G06E 1/00* (2006.01)
(52) U.S. Cl. ........................... 706/12; 711/108; 600/300
(58) Field of Classification Search ..................... 706/12
See application file for complete search history.

(56) References Cited

U.S. PATENT DOCUMENTS

| 2002/0107822 A1* | 8/2002 | Helmick ........................ 706/26 |
| 2004/0193789 A1* | 9/2004 | Rudolf ........................... 711/108 |
| 2011/0099130 A1* | 4/2011 | Blumberg et al. ............. 706/12 |

FOREIGN PATENT DOCUMENTS

| JP | 09-081205 A | 3/1997 |
| JP | 2000-035956 A | 2/2000 |
| JP | 2005-078519 A | 3/2005 |

OTHER PUBLICATIONS

Shin'ya Yamamoto et al; "Kyoka Gakushu ni Okeru Kankyo Henka Ninshikiho," IEICE Technical Report; The Institute of Electronics; Information and Communication Engineers; Jan. 13, 2000; vol. 99; No. 534; pp. 31-36.

Wataru Uemura et al; "POMDPs Kankyo no Tameno Episode Kyokagata Kyoka Gakushuho," The Transactions of the Institute of Electros; The Institute of Electronics; Information and Communication Engineers; Jun. 1, 2005; vol. J88-A; No. 6, pp. 761-774.

International Search Report of PCT/JP2006/316659, date of mailing Sep. 19, 2006, all pages.

(Continued)

*Primary Examiner* — Omar Fernandez Rivas
*Assistant Examiner* — Kalpana Bharadwaj
(74) *Attorney, Agent, or Firm* — Westerman, Hattori, Daniels & Adrian, LLP

(57) ABSTRACT

Reinforcement learning is one of the intellectual operations applied to autonomously moving robots etc. It is a system having excellent sides, for example, enabling operation in unknown environments. However, it has the basic problem called the "incomplete perception problem". A variety of solution has been proposed, but none has been decisive. The systems also become complex. A simple and effective method of solution has been desired.

A complex value function defining a state-action value by a complex number is introduced. Time series information is introduced into a phase part of the complex number value. Due to this, the time series information is introduced into the value function without using a complex algorithm, so the incomplete perception problem is effectively solved by simple loading of the method.

5 Claims, 3 Drawing Sheets

OTHER PUBLICATIONS

Yamamoto, S. et al; "A recognition method of environmental change on reinforcement learning"; The Institute of Electronics, Information and Communication Engineers, pp. 31-36.

Uemura, W. et al.; "An Episode Based Profit Sharing Method for POMDPs"; POMDPs, vol. J88-A, No. 6, pp. 761-774, 2005.

Sutton, R.S. et al.; "Reinforcement Learning"; Adaptive Computation and Machine Learning Series, A Bradford Book, MIT Press, pp. 1-23.

Russell, S. et al.; "Chapter 21 Reinforcement Learning"; Artificial Intelligence, A Modern Approach, Second Edition, pp. 763-789.

* cited by examiner (A) MAZE 1

(B) MAZE 2

(C) MAZE 3

(D) MAZE 4

(E) MAZE 5

VALUE FUNCTION REPRESENTATION METHOD OF REINFORCEMENT LEARNING AND APPARATUS USING THIS

TECHNICAL FIELD

The present invention relates to reinforcement learning method applied to autonomously moving robots etc. and an apparatus using the same.

BACKGROUND ART

Reinforcement learning is an intellectual operation where an active subject such as an autonomously moving robot observes its own environment, acts, and acquires the next suitable plan from the results. In particular, the "environment identification technique" is a learning means not using a teaching signal, therefore is to be a system suited for determining action in an unknown environment. As typical reinforcement learning methods, the "Q-learning" and other environment identification techniques finding a value function of a state-action pair and the "experience reinforcement technique" utilizing an episode stored in a memory are known.

For the general theory of the reinforcement learning method, [1] S. Russell and P. Norvig: *Artificial Intelligence-A Modern Approach*, Prentice Hall, 1995 (translated into Japanese as "Agent Approach-Artificial Intelligence", KYORITSU SHUPPAN, 1997) or [2] R. S. Sutton and A. G. Barto: *Reinforcement Learning-An Introduction*, The MIT Press 1988 (translated into Japanese as "Reinforcement Learning", Morikita Publishing, 2000) are detailed.

There are many enhancements and applications for the reinforcement learning method. For example, speaking of the basic algorithm, continuous state spaces are being handled in the learning, and R&D aimed at improvement of the learning speed is being carried out. For example, there is the [3] agent learning apparatus (Japan Science and Technology Agency, Patent Document 1).

[Patent Document 1] Japanese Patent Publication (A) No. 2000-35956

DISCLOSURE OF THE INVENTION

Problem to be Solved by the Invention

The basic problem in the reinforcement learning method is the "incomplete perception problem". In environment identification type reinforcement learning, the value of the value function is determined for a pair of a state and action. The larger this value, the more suitable the action is for that state. The algorithm is relatively simple and easy to load, but in terms of the real environment and environment detection capability, there are innumerable spaces corresponding to a certain state. The problem arises that selection of different actions is required for each. This is the "incomplete perception problem".

An environment in which the incomplete perception problem arises is an environment comprised of Non-Markov processes. It is known that with Q-learning and other conventional reinforcement learning methods, this cannot in principle be handled. For the incomplete perception problem, it may be considered to introduce a hypothesis based of the heuristics of the designer and new parameters, however the effects are not guaranteed. For example, in the above Document [3], a method of predicting a change of the environment and automatically switching among a plurality of learning modules in accordance with the change is provided. However, there is a problem that the parameter for determining the shared range of each learning module depends upon the task.

In Document [4] Japanese Patent Publication (A) No. 2005-78519 "Inner Parameter Estimation Apparatus, Inner Parameter Estimation Method, and Inner Parameter Estimation Program" (Advanced Telecommunications Research Institute International (ATR)), the method of providing a mechanism for estimating the inner parameter and representing a state which cannot be directly observed as a meta-parameter is proposed. However, the number of inner states and the dimensions of the inner parameter are set depending upon the heuristics of the designer. Further, according to Document [5], Japanese Patent Publication (A) No. 9-81205 "Learning System" (Fujitsu), an experience reinforcement type reinforcement learning method of the episode storing type storing several time series information (contexts) in a memory and determining an action to be taken from the history of the states is proposed. This method directly holds the contexts, therefore can cope with non-Marcov process environments. However, what length of context should be held, the setting of the search range at the time of learning, etc. inevitably greatly depends upon the heuristics of the designer. This is the reason why a solution which does not depend upon heuristics, which has many problems in terms of reliability, and does not use much memory or other resources is desired.

Means for Solving the Problem

The point of the solution of the problems in the present invention resides in incorporating context such as episode storage into the value function by a simple method. For this purpose, a complex value function defining the state-action value by a complex number is introduced. The time series information is mainly introduced into a phase part of the complex number value. Due to this, the time series information is introduced into value function without using a complex algorithm. Loading is easy, yet the incomplete perception problem can be solved.

Namely, the invention described in claim 1 is a value function representing method of reinforcement learning characterized by dealing with the incomplete perception problem by using a complex number value function for the value function and introducing time series information into a phase part of the complex number or the phase part and amplitude part. Further, the invention described in claim 2 is a value function representing method of reinforcement learning using the Q-learning method as the reinforcement learning method.

The invention described in claim 3 is an apparatus using a value function representing method of reinforcement learning characterized by dealing with the incomplete perception problem by using a complex number value function for the value function, and including time series information into a phase part of the complex number or the phase part and amplitude part.

The invention disclosed in claim 4 is an apparatus using a value function representing method of reinforcement learning as set forth in claim 3, characterized by updating a value function calculated from a positional relationship of vectors of the value function of a complex number value and a reference value of a complex number value based on a value selected in the past. Further, the invention disclosed in claim 5 is an apparatus using a value function representing method of reinforcement learning as set forth in claim 4, characterized by updating the value function by using a vector inner product of the value function of a complex number value and a reference value of a complex number value based on a value selected in the past.

Effects of Invention

The present invention was made to solve the incomplete perception problem by simple loading without using a complex algorithm. Therefore, the essential defect caused by the incomplete perception problem is solved, and it becomes possible to easily produce a robot able to learn autonomous motion. The range covered by the incomplete perception problem is vast. The range of the problem to be solved by the present invention is also vast. Therefore, the technical and economical effects are great.

BEST MODE FOR CARRYING OUT THE INVENTION

Figure 1:
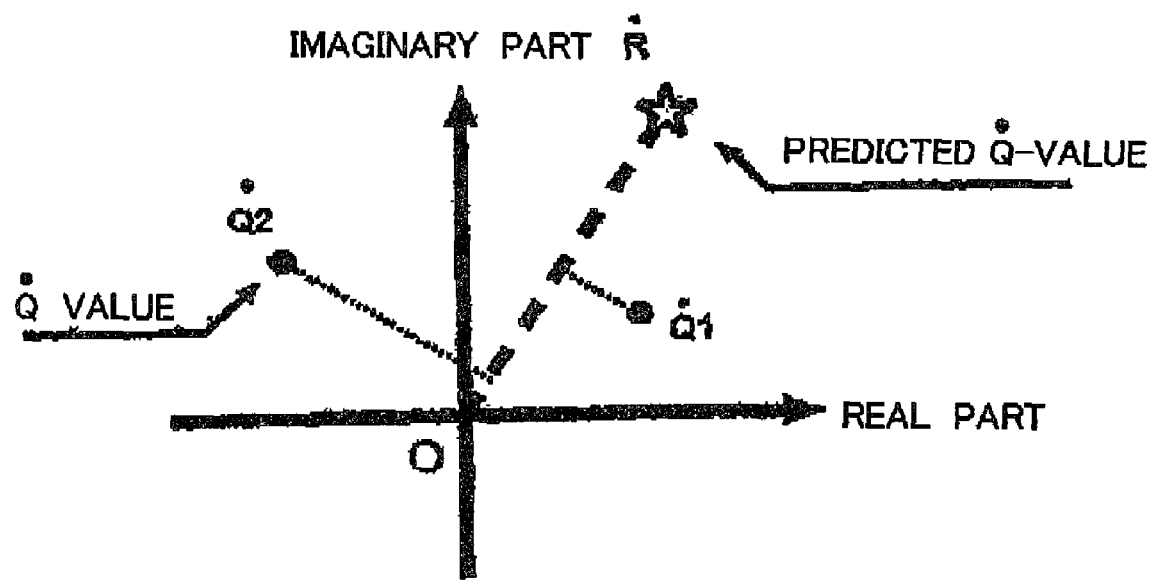
[FIG. 1] A diagram showing a complex Q-value in a certain state on a complex plane.

As a concrete example, an explanation will be given of the method of handling a Q-value in O-learning as a complex number. The fact of the Q-value being a complex number is explicitly represented as the "complex Q-value". The point of the present invention resides in adding phase rotation so as to include time series information (context) when obtaining a complex Q-value relating to the state of a transition destination in an update formula of the complex Q-value. Namely, it considers a phase difference from the complex Q-value of the action immediately before to predict the complex Q-value which will be selected at the next step. FIG. 1 shows the relationship between the predicted complex Q-value (complex vector R) and complex Q-values (complex Q1 and complex Q2) corresponding to the selectable actions. When the phase term of the complex vector R changes, an inner product with each complex Q-value changes as well, That is, a length between a foot brought down from each complex Q-value to the straight line connecting the complex vector R and the origin at a right angle and the origin changes. When handling the Q-value as a real number, only magnitudes can be simply compared. However, if using the complex Q-value, a comparison including phase difference becomes possible. Due to this, selection of an action incorporating the time series without using complex algorithm becomes possible.

[Formulization of Update Algorithm]

The update rule of the complex Q-value when taking an action $a_i$ from a state $s_i$, shifting to a state $s_{i+1}$, and receiving a reward r is defined as in Formula 1.

$$\dot{Q}(s_{i-k}, a_{i-k}) \leftarrow (1-\alpha)\dot{Q}(s_{i-k}, a_{i-k}) + \alpha(r + \gamma \dot{Q}_{max}^{si \to si+1})\dot{u}(k) \quad \text{[Formula 1]}$$

Here, the stat and action before a k step are defined as $s_{i-k}$ and $a_{i-k}$. u(k) is a complex function. It is a qualification trace in form and defined as in Formula 2. In Formula 2, the function u is given a dot indicating a complex number. In Formulas 2 and 5, the function β is given a dot indicating a complex number.

$$\dot{u}(k) = \dot{\beta}^k \quad \text{[Formula 2]}$$

Formula 1 is applied in the range of $0 \leq k \leq Ne$ using a predetermined integer Ne.

Note that β is a complex number with an absolute value of 1 or less.

The complex Q-value in Formula 1 is defined as in Formula 3.

$$\dot{Q}_{max}^{si \to si+1} = \dot{Q}(s_{i+1}, \acute{a}) \quad \text{[Formula 3]}$$

where, a' is defined as in Formula 4.

$$\acute{a} = \arg\max Re[\dot{Q}(s_{i+1}, \acute{a})\overline{R_i}] \quad \text{[Formula 4]}$$

where, the anticipated complex 2-value (complex vector $R_i$) is defined as in Formula 5.

$$R_i = \dot{Q}(s_i, a_i)/\dot{\beta} \quad \text{[Formula 5]}$$

[Formulization of Action Selection Algorithm]

Here, Max-Boltzmann selection is used. Namely, it is assumed that an agent existing in the state $s_i$ performs a Boltzmann selection with a probability 1-Pmax and adopts a Greedy policy with a probability Pmax.

The complex Q-value corresponding to the state $s_i$ and action at is defined as the "complex $Q(s_i,a_i)$". Further, the Boltzmann selection probability of an action a in the state $s_i$ is defined as "Prob($s_i$,a)". When defining an action set in the state $s_i$ as "$A(s_i)$", defining a complex Q-value corresponding to the state and action immediately before the present state and action as the "complex $Q(s_{i-1},a_{i-1})$", and defining a temperature parameter of the Boltzmann selection as "T", Prob ($s_i$,a) is determined as in Formula 6.

$$Prob(s_i, a) = \frac{\exp(Re[\dot{Q}(s_i, a)\overline{R_{i-1}}]/T)}{\sum_{\acute{a} \in A(s_i)} \exp(Re[\dot{Q}(s_i, \acute{a})\overline{R_{i-1}}]/T)} \quad \text{[Formula 6]}$$

where, Re [complex function] represents the real part of the complex number.

It is assumed that the greedy policy selects arg maxaProb ($s_i$,a).

[Computer Experiments]

Figure 2:
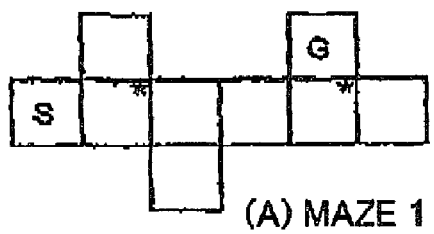
[FIGS. 2] (a) to (e) are diagrams showing experiment environments of computer experiments and show grid worlds for solving simple maze problems.
Figure 2:
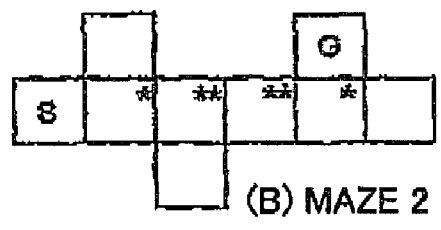
Figure 2:
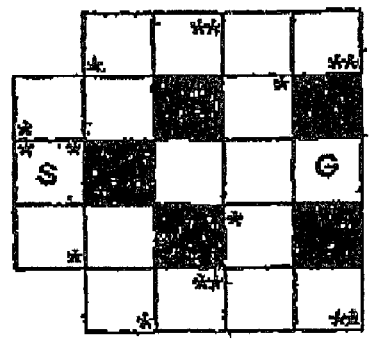
Figure 2:
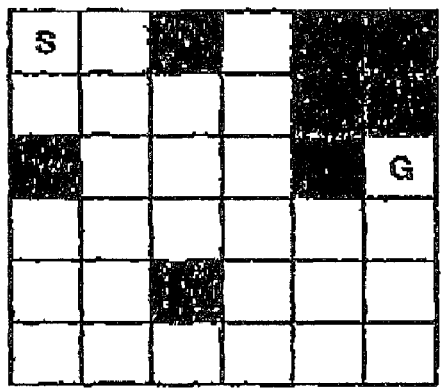
Figure 2:
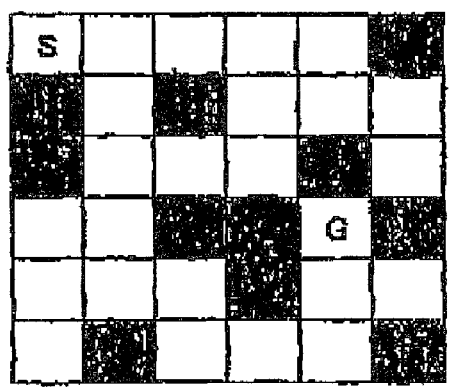

Computer experiments were run aimed at maze problems in a simple grid world such as in FIG. 2 to confirm the validity of the proposed technique.

[State Space and Action Set]

It is assumed that the information which can be observed by the agent is only the presence/absence of walls of the four surrounding squares at the east, west, north, and south. This information is assigned as direct states. Namely, the number of states which can be observed becomes 24=16. In these environments, there are states influenced by incomplete perception, For example, at the asterisks *, the action to be selected differ, while at **, the same action must be taken. The only action selectable by the agent in any state is to "proceed in a direction with no wall". Namely, action set A=partial set not including empty set of {east, west, south, north}.

[Parameter Setting]

It was assumed that the agent received a reward r=100 from the environment when reaching a goal and is redeployed at the initial state, that is, the "start". A method of giving a reward that encourages learning to reach the goal early, for example, giving a negative reward for each step of action of the agent or changing the reward in accordance with the number of steps taken for reaching the goal is not performed.

A number of trials of 100 was divided into three phases, and a parameter was set for each. The parameters changing for each step were set as in Table 1, the parameters other than those were made common in all phases, and $\beta=0.9\exp(j\pi/6)$, $\nu=0.999$, $T=3000$, and $Ne=1$ were set, where $j^2=-1$.

TABLE 1

|  | Trial | $\alpha$ | $1 - P_{max}$ |
|---|---|---|---|
| Phase 1 | 1 to 20 | 0.05 | 0.1 |
| Phase 2 | 21 to 80 | (100 − try)/400 | (100 − try)/1600 |
| Phase 3 | 81 to 100 | 0 | 0 |

[Experiment Results]

Figure 3:
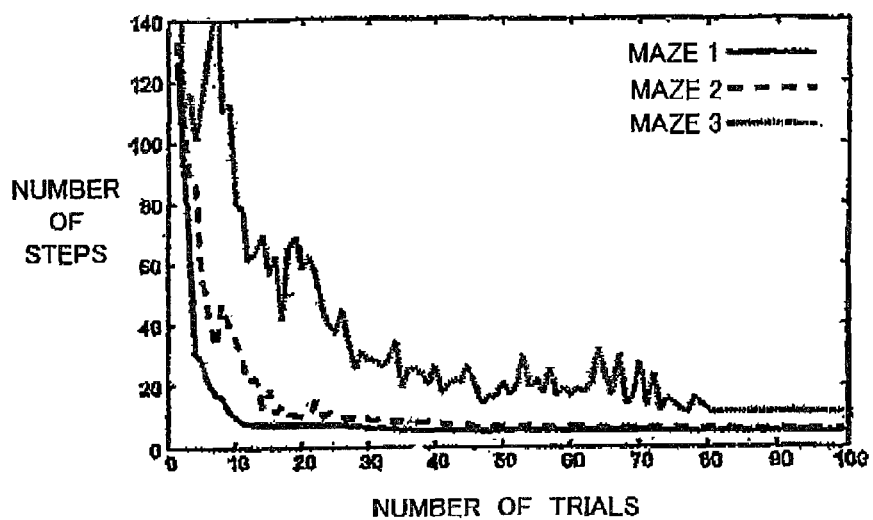
[FIG. 3] A diagram showing results of computer experiments.

The results of the computer experiments are shown in FIG. 3. These results are averages for the converged values when performing 100 learning operations each comprised of 100 trials.

In the maze 1 and maze 2, there was 100% convergence, while in the maze 3, there was 95% convergence. By the present computer experiments, a policy was acquired by which the minimum length path was realized in 100% of the cases in the maze 1 and maze 2.

In the maze 1, a policy realizing the minimum length path could be acquired. If observing the series of actions, it was learned to shift from a complex Q-value corresponding to the next action of a certain complex Q-value by exactly an argument β. In the maze 2 as well, a policy realizing the minimum length path could be acquired. This was not a simple phase relationship like maze 1, but it was observed that the incomplete perception problem was solved by autonomously adjusting the phase. In the maze 3, no learning of a policy realizing the minimum length path was seen, but it was observed that the incomplete perception problem was solved by partial reciprocation in the environment to autonomously multiplex environments.

The maze 4 and maze 5 are examples of grids which cannot be solved by a conventional technique, but could be solved according to the present invention.

In these cases as well, actions autonomously solving the problem could be acquired. The effect of solution of the incomplete perception problem according to the present invention was seen.

Figure 4:
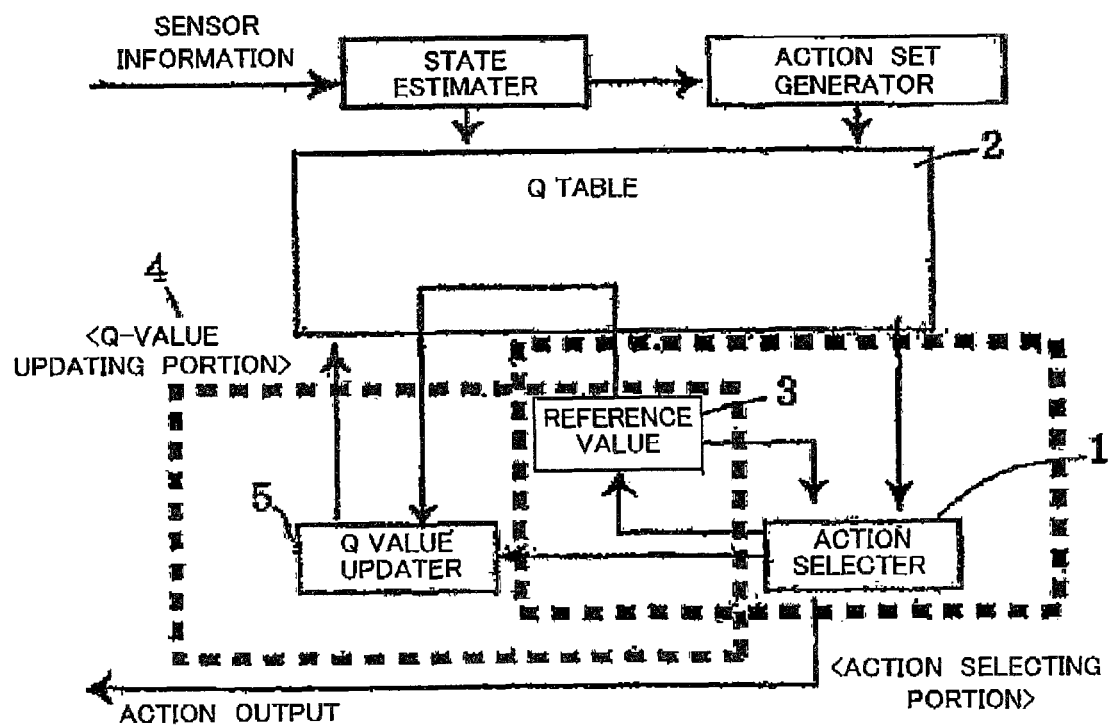
[FIG. 4] A block diagram of an apparatus loaded with the Q-learning method according to the present invention.

FIG. 4 is a block diagram showing a concrete example of the apparatus according to the present invention, that is, an apparatus loaded with the complex Q-learning method. An action selector 1 selects one value from a Q-value set transferred from a Q-table 2 using a previous reference value as the standard. A Q-value changer 4 selects one value from the Q-value set after the transition using a new reference value as the standard, designates it as a target value for updating. The Q-value changer 5 executes the change.

Note that in the present embodiment, the value function was converted to a complex number and the phase was obtained by calculation as in [Formula 2], but the method of conversion to a complex number and obtaining the phase is not limited to this. For example, in FIG. 1, it is possible to change the phases of a complex $Q_1$ and complex $Q_2$ based on the time series information or change not only the phase, but also the amplitude. The actual calculation method should be suitably selected according to the environment. The gist of the present invention resides in using a complex value function and introducing time series information into the phase term and extends to all methods of introduction.

Further, in the present embodiment, the example of applying the technique of using a complex value function to the Q-learning method was shown, but the essence of the present invention resides in the use of a complex value function. Accordingly, for example, all of the TD method, SARSA method, Actor Critic method, R-learning method, Profit Sharing method, and other methods using value functions effectively function.

In the present embodiment, Max-Boltzmann selection was employed as the action selection algorithm. However, any algorithm able to calculate the probability of selection of the real number value from a complex number value output from a complex value function may be employed. All of methods of calculation generally used in science and engineering fall within the scope of the present invention.

Industrial Applicability

The incomplete perception problem is a basic problem in reinforcement learning. If the present invention can solve this, many problems in environment identification type learning would be spontaneously solved and autonomous motion learning by a robot having inexpensive sensors would become possible. The present invention is cheap and easy to load, so the economic effect is large. Further, the incomplete perception problem is a problem appearing in multiagent systems and other simultaneous learning of many learning subjects. The present invention can be effectively used even in applications where efficient learning as a group is required, for example, multi-robot and multi-point search algorithms.

The invention claimed is:

1. A value function representing method of reinforcement learning executed in an autonomously moving robot, comprising:
   causing said robot to respond to an incomplete perception problem by using a function of a complex number value for a value function and introducing time series information into a phase part of the complex number or a phase part and an amplitude part of the complex number.

2. The method as set forth in claim 1, further comprising: using a Q-learning method as the reinforcement learning method.

3. A computer used for an autonomously moving robot using a value function representing method of reinforcement learning, said computer executing a step of: responding to an incomplete perception problem by using a function of a complex number value for a value function and including time series information into a phase part of a complex number or a phase part and amplitude part of the complex number.

4. The computer used for the autonomously moving robot using a value function representing method of reinforcement learning as set forth in claim 3, further comprising:
   updating the value function calculated from a positional relationship of vectors of the value function of the complex number value and a reference value of the complex number value based on a value selected in the past.

5. The computer used for the autonomously moving robot using a value function representing method of reinforcement learning as set forth in claim 4, further comprising:
   updating the value function by using a vector inner product of the value function of the complex number value and the reference value of the complex number value based on a value selected in the past.

* * * * *